(No Model.)

F. H. KINDL & C. V. CHILDS.
BUILDER'S CHART.

No. 472,266. Patented Apr. 5, 1892.

Witnesses

Inventors
F. H. Kindl, C. V. Childs
by W. Bakewell & Sons
Attorneys

UNITED STATES PATENT OFFICE.

FREDERICK H. KINDL AND CHARLES V. CHILDS, OF PITTSBURG, PENNSYLVANIA.

BUILDER'S CHART.

SPECIFICATION forming part of Letters Patent No. 472,266, dated April 5, 1892.

Application filed November 12, 1891. Serial No. 411,703. (No model.)

*To all whom it may concern:*

Be it known that we, FREDERICK H. KINDL and CHARLES V. CHILDS, of Pittsburg, in the county of Allegheny and State of Pennsylvania, have invented a new and useful Improvement in Constructing Engineers' and Architects' Charts, of which the following is a full, clear, and exact description.

Our invention relates to an improvement in charts for the use of constructing engineers in determining the proper size and weight of steel beams to be used in structural floor-work, &c.

It is illustrated in the accompanying drawing, which illustrates the chart in plan view.

Our improved chart is printed or etched or otherwise marked upon a sheet of suitable transparent material, such as celluloid, &c. In general design the chart comprises series of parallel vertical lines intersected at right angles by series of horizontal lines. At the ends of one of these series of lines are placed numbers "1, 2, 3, 4," &c., consecutively, intended to denote the floor-space supported by the beams—*i. e.*, the interval between the sides of two adjacent parallel beams. At the ends of the lines of the other series are numbers similarly arranged and intended to denote the length in feet of span of the beam—*i. e.*, the distance between its points of support.

In employing the chart to ascertain the weight and size of beam necessary to be used under certain conditions of floor-space and length of span the user looks at the intersection of the lines whose numbers correspond to the length of floor-space and span. The result is indicated by curved lines B, which are laid out on the chart so as to intersect the squares at whose upper left-hand corners are the intersections of the straight lines, which indicate the conditions under which a beam of the size and weight represented by the curved lines is proper, and each curved line is marked with the number and weight of beam calculated to support a load of unit weight—say one hundred pounds to the square foot. Thus the uppermost of the curved lines shown on the chart and representing a four-inch steel I-beam No. 7.5 intersects the squares, which indicates that such beam is proper to be used under the following conditions: Ten feet span by three feet floor-space, or eight feet span by five feet floor-space, or seven feet span by six feet floor space, or six feet span by eight feet floor-space, &c.

The lines on the chart shown are separated by spaces laid off on a scale of one-fourth inch to a foot.

In using the chart the plan of the intended structure is laid out on paper on the scale above stated, (one-fourth inch to the foot.) The transparent chart is then placed on the drawing so that the mark at the upper left-hand corner shall coincide with one of the points of support of the beam. The length of the span and the width of floor-space are then noted, as shown by the chart, and by following to their intersection the lines at the points noted the desired beam will be found. If the beams are intended to support a heavier load than one hundred pounds to the square foot (the standard load for which the chart is calculated)—*e. g.*, one hundred and fifty pounds—the user should add a proportionate length to the floor-space in determining the reading—in the case supposed one-half. Thus to get the reading for a beam of ten feet span and six feet floor-space for one hundred and fifty pounds per square foot one should get from the chart the reading for ten feet span and nine feet floor-space. We prefer, also, to put other dotted curved lines, which represent the modified readings to be used when the calculation is to be made for beams which carry plastered ceilings.

In the squares included between the intersecting lines we may place figures indicating the load in tons on the floor area which can be supported by beams of the dimensions shown by the other readings.

Modifications in the form and style of the chart will be suggested to the skilled engineer on reading the foregoing specification.

We claim as our invention—

1. A chart of the character described, consisting of a transparent plate having marked thereon intersecting parallel lines representing span and floor-space and curved lines intersecting the parallel lines and representing the dimensions of the beams to be used, substantially as and for the purposes described.

2. A chart of the character described, consisting of a transparent plate having marked thereon intersecting parallel lines dividing the chart into equal divisions on a known scale and representing the dimensions forming the bases of calculation and curved lines intersecting said divisions and indicating the results of the calculations.

In witness whereof we have hereunto set our hands this 28th day of October, A. D. 1891.

FREDERICK H. KINDL.
CHAS. V. CHILDS.

Witnesses:
D. B. KENNEDY,
HENRY L. JONES.